R. A. FESSENDEN.
SIGNALING BY ELECTROMAGNETIC WAVES.
APPLICATION FILED JULY 8, 1903.
1,184,843.
Patented May 30, 1916.
2 SHEETS—SHEET 1.
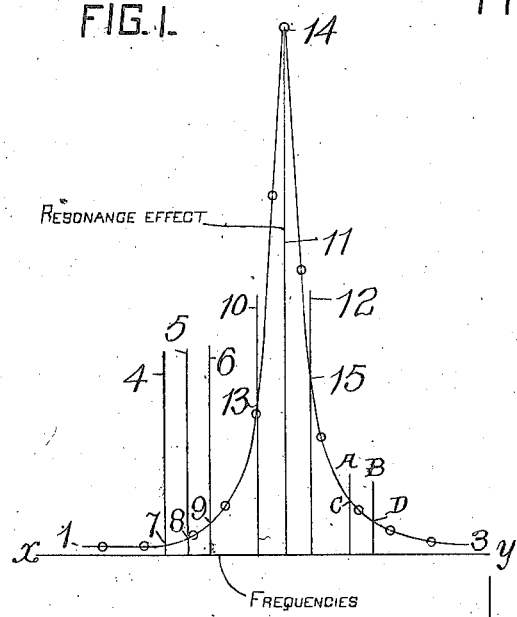
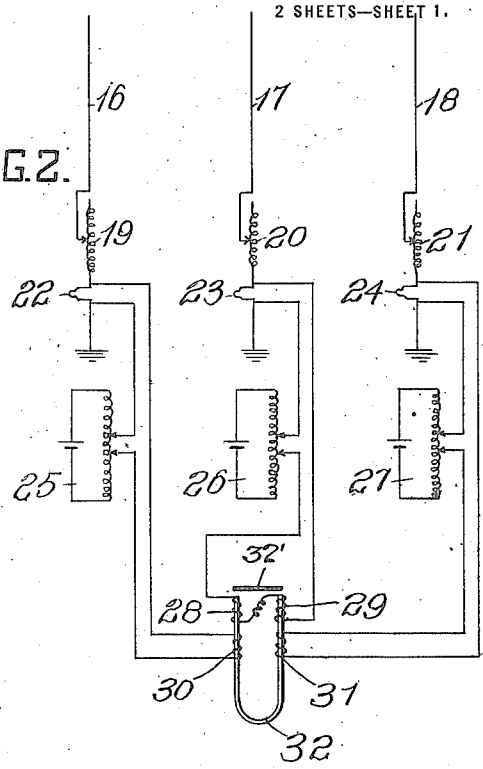
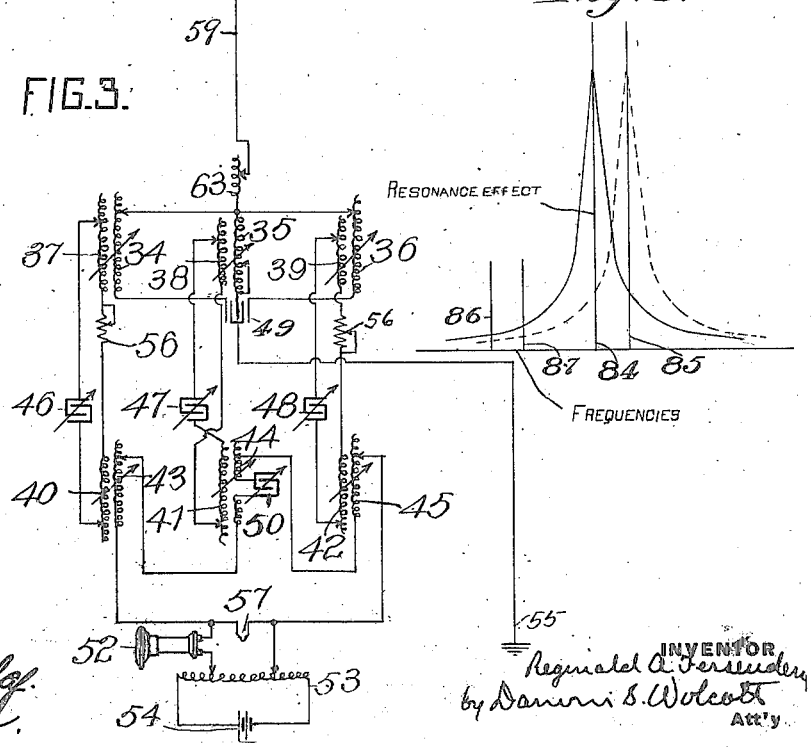
WITNESSES:
Robert Bradley.
Fred Kirchner.
INVENTOR
Reginald A. Fessenden,
by Darwin S. Wolcott
Att'y R. A. FESSENDEN.
SIGNALING BY ELECTROMAGNETIC WAVES.
APPLICATION FILED JULY 8, 1903.
1,184,843.
Patented May 30, 1916.
2 SHEETS—SHEET 2.
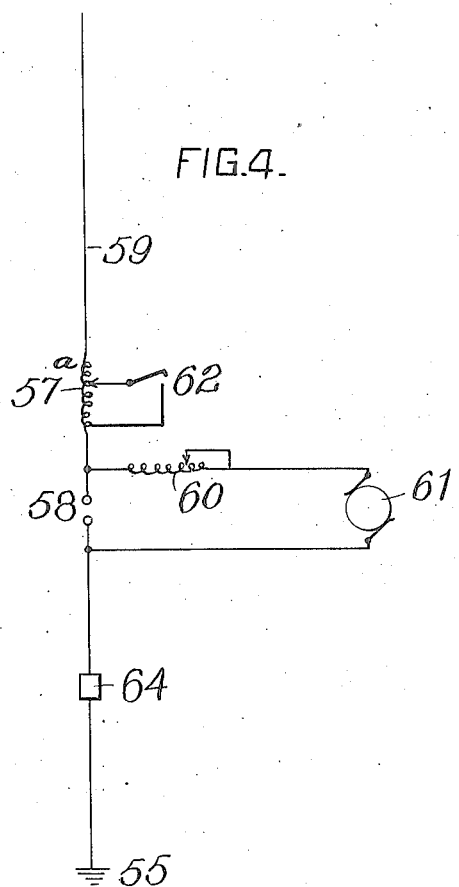
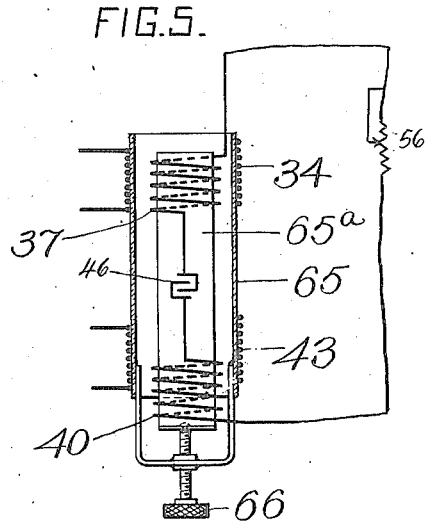
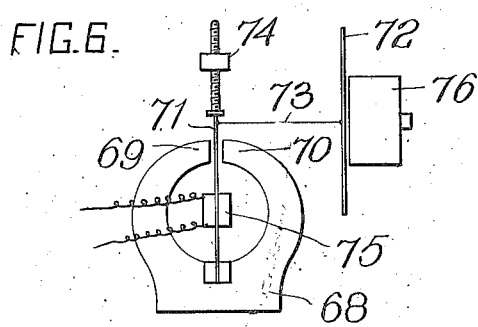
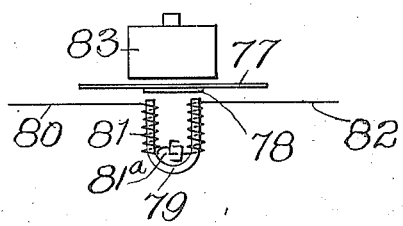
WITNESSES:
Herbert Bradley
Fred Kirchner
INVENTOR
Reginald A. Fessenden
by Darwin S. Wolcott
Att'y

UNITED STATES PATENT OFFICE.

REGINALD A. FESSENDEN, OF FORTRESS MONROE, VIRGINIA, ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, RECEIVERS.

SIGNALING BY ELECTROMAGNETIC WAVES.

1,184,843.   Specification of Letters Patent.   Patented May 30, 1916.

Application filed July 8, 1903. Serial No. 164,733.

*To all whom it may concern:*

Be it known that I, REGINALD A. FESSENDEN, residing at Fortress Monroe, in the county of Elizabeth City and State of Virginia, a citizen of the United States, have invented or discovered certain new and useful Improvements in Signaling by Electromagnetic Waves, of which improvements the following is a specification.

The invention described herein relates to methods for securing freedom from disturbances in the transmission of telegraphic messages, whether such disturbances originate in the stations, from outside stations or from atmospheric disturbances.

The invention has a particular relation to the method in which conductors are shown so arranged as to equalize each other's effect as regards disturbing impulses while permitting signals to be received when of the desired periodicity.

It also bears a particular relation to systems in which prolonged trains of waves are emitted and received and indications produced at the receiving station by a cumulatively acting receiver situated in a closed tuned circuit and tuned to group frequencies as well as wave frequencies.

One of the most important problems in signaling by electro-magnetic waves is the matter of interruption from disturbing sources. This disturbance cannot be cut out by simply tuning the circuits to a wave frequency, as applicant has discovered. Assume for example, that two stations are capable of working over a distance of one hundred miles and are located about a quarter of a mile away from each other. Since the energy varies as the square of the distance, 160,000 times as much energy will be received from one station by the neighboring station, as is received by the station to which the message is being sent. It is evident therefore that the resonant rise must be in the neighborhood of 500,000 in order to prevent disturbances. Such a very large resonant rise cannot be obtained, as it would necessitate an absolutely infinitesimal amount of dampening in the receiving circuit, and would moreover not permit of rapid telegraphy as the trains of waves would have to persist over a large fraction of a second. This applicant proposes to use more than one receiving circuit, whereby disturbing impulses may be made to neutralize each other. This method while well adapted for its purpose, does not give complete neutralization where a large number of stations within range of each other are operated at frequencies approximating that of the station, whose resonant point is located by the maximum ordinate 14 of the curve, at the points A, B, Figure 1, where the ordinates C, D, represent the effects produced by disturbing impulses and the abscissæ $x$ $y$ represents frequencies.

It will be seen that the ordinate C is slightly larger than the ordinate D and hence the neutralization will not be complete. To be made complete for this periodicity the effect of one of the conductors must be greater than that of the other. In this case a disturbing impulse whose periodicity is lower than the periodicity indicated by C and D, will effect a conductor tuned to D more than one tuned to C, since the maximum point is now to the right and consequently the conductors will fail to neutralize each other. My method overcomes the difficulties, especially where a large number of stations are being used in close proximity.

In the accompanying drawings forming a part of this specification, Fig. 1 is a graphic showing of resonance effects. Figs. 2 and 3 are diagrams of two different specific forms of selective receiving systems protected from disturbances in accordance with the principles of my invention. Fig. 4 is a diagram of transmitters. Fig. 5 is a longitudinal section of an adjustable transformer and Figs. 6 and 7 are detail views of mechanically tuned receivers adapted for use in my system. Fig. 8 is a diagrammatic view showing displacement of resonance point when using apparatus shown in Fig. 4.

The method shown herein is based upon the fact that resonant curves have in general a curvature which is always of the same sign, and hence by the use of three circuits all very strongly tuned and with very small dampening so as to allow larger resonant rise, one circuit tuned to the period at which it is desired to receive, one tuned to a higher period and the other to a lower period, the higher and lower circuits may be made to neutralize the effect of disturbing impulses produced on the receiver by the properly tuned circuit. For example, if in Fig. 1, three receiving circuits have the frequencies indicated by the abscissæ of 4, 5 and 6, 5 representing the periodicity at which it is desired to receive, the effect produced on the circuits by a disturbing signal whose frequency is located by the ordinate 11 may be represented by ordinates 7, 8 and 9. If the circuits corresponding to 4 and 6 be proportioned whether by trial or calculation or both combined, so as to neutralize the effect produced on the conductor tuned to periodicity 5, then no disturbing signals will be received. If, however, the periodic disturbance which it is desired to receive and whose frequency is located by the ordinate 11, is impressed on three circuits whose natural periods are indicated by the abscissæ of the ordinates 10, 11 and 12 so that the periodic disturbance is in resonance with 11, it will be seen that the effects produced are proportioned to the ordinates 13, 14, and 15 and that the effect on the proper circuit will not be neutralized and in fact not affected to any great extent, so that a strong signal will be produced. It is found that the neutralization will be complete no matter if the disturbing impulse is higher or lower than that at which it is desired to receive, and that at all points except at points very close to the resonant point, neutralization may be practically complete, especially if the lower or higher circuits be dampened as by eddy-current losses or resistance losses to a higher degree than the middle one. All circuits however, should be strongly oscillatory.

Where it is desired to make the selectivity still more pronounced it is preferred to use a receiver tuned to group frequencies as well as to wave frequencies and by this combination entire freedom from all disturbances is obtained and it is possible to work any desired number of stations in close proximity to each other.

In Fig. 2, showing one arrangement for accomplishing the desired result, the three receiving conductors, 16, 17 and 18, are tuned, 17 to the proper periodicity at which it is desired to receive, 16 to a higher periodicity and 18 to a lower periodicity. Coils 19, 20 and 21 are used for tuning but they are preferably arranged as by putting in resistance so as to avoid unduly prolonging the oscillations of the conductors for this would cause a loss of efficiency when acting as a receiving conductor. The receivers 22, 23 and 24 are preferably of the current operated type. An indicating mechanism 32, 32', such as a telephone is operated by the current in the local circuits 25, 26 and 27 causing the coils 28, 29, 30 and 31 to vary when the receivers 22, 23 and 24 are operatively affected by electro-magnetic waves. That is, the coils 30 and 31 act in the same direction on the magnet 32, but together act in opposition to coils 28 and 29. The latter coils acting together, the effect is so diminished that when the disturbing effects on the three antenna are the same, the resulting effect on magnet 32 is practically reduced to zero. This can be accomplished by either making the coils 30 and 31 slightly weaker than the coils 28 and 29, or by adjustment of the sources of voltage in the circuits 25, 26 and 27. In operation a disturbing impulse striking all three conductors will, if it is not in tune, produce very closely equal effects on the receivers 22, 23 and 24. Hence as is shown, these effects will neutralize each other as regards the indicating mechanism 32 and no indication will be produced. On the other hand, if the oscillations are tuned to the proper periodicity the receiver 23 will be effected much more strongly than 22 and 24 and an indication will be produced. For many purposes instead of grounding the conductors 16, 17 and 18 the portion of the conductors beyond the receivers 22, 23 and 24 may be constructed as by lengthening them so as to be electrical equivalents of the portions of the conductors above the receivers. A single vertical and several branch circuits may be employed in lieu of the three separate verticals. Three branches, 34, 35 and 36 extend from the vertical 59, which is connected to ground.

In Fig. 3 the circuit comprising the vertical 59, with its adjustable inductance 63 and branch circuit 35 and its connection to ground is resonant to the proper periodicity, while the circuit comprising vertical 59, and its connection to ground through the branch circuit 34 is resonant to a higher periodicity, the circuit comprising vertical 59 and its connection to ground through the branch circuit 36 is resonant to a lower periodicity than that of the circuit comprising vertical 59 and its connection to ground through branch circuit 35. The inductances in the branches 34, 35 and 36 form primaries of transformers, whose secondaries, 37, 38 and 39 are in circuit with the primaries 40, 41, 42, whose secondaries 43, 44 and 45 are preferably in series with each other. Capacities 46 and 47 and 48 may be inserted in the transformer circuits as shown and the capacity 49 may be inserted in the circuit to ground of the receiving conductor. I prefer to use an additional tuning inductance 63, in addition to the other tuning means. A capacity 50 may be inserted in the secondary 44. A receiver 77 preferably of the current operated type, as for example a magnetic receiver as in Fig. 7 may be substituted for receiver 57. The position of the receiver 57 and the capacity 50 may be interchanged. The indicating mechanism 52, as a telephone, is preferably adapted to respond to only one frequency. 53 is the local resistance for adjusting the local voltage by shunting more or less of the resistance 53, and 54 is the local source of voltage. This method of adjusting the local voltage is similar to that shown in the local circuits 25, 26 and 27 Fig. 2. The circuit 43, 57, 45, 44, 50 is preferably tuned to the periodicity of the circuit 59, 35, 49, 55. A ring of nickel, or a resistance 56 is so arranged as to produce an adjustable amount of dampening in the circuits 37, 40, 46 and 39, 42, 48, while still leaving them strongly oscillatory.

The operation of the combination shown in Fig. 3 is similar to that shown in Fig. 2, the general character of the results produced being effected by use of branch circuits and transformers instead of single circuits without transformers although in general the action is more complete and efficient. As in the construction shown in Fig. 2, a disturbing impulse which is not of a proper periodicity, produces impulses in the branch circuits which are neutralized and do not produce indications in the indicators or the indicating mechanism, while a periodic impulse in resonance to the circuit 33, 35, 49, 55, does produce an indication. Thus, disturbing impulses received by antenna 59 produce effects in coils 43 and 45 which, taken together, present an equal and opposed effect to that produced in coil 44, thereby neutralizing the effect on the receiver 57.

In the method of sending as shown in Fig. 4, the sending conductor 59, 57ª, 55 is grounded. An inductance 57ª is used for tuning. A self-inductance 60 is arranged in the circuit of the source of voltage, which is preferably constant. A key 62 is employed for cutting in and out a portion of the inductance 57ª and hence operates to change the periodicity of the sending oscillations. In operation, the source of voltage 61 charges the sending conductor until the discharge passes across the gap 58, which may be formed of a mercury lamp. The presence of inductances 60 and 57ª and the capacity of the vertical wire 59 causes high frequency oscillations to be generated, whose frequency is determined by the electrical constants of the circuits. In place of the inductance 60 in Fig. 4 an ohmic-resistance with small self-inductance may be substituted.

In Fig. 5 is shown the method of arranging the sets of primaries and secondaries, for example, the set including the primary 34, 40 and the secondaries 37, 43 in Fig. 3. The primary 34 and secondary 43 are wound at opposite ends of the glass tube 65 and the secondary 37 and primary 40 are also wound on opposite ends of the glass tube 65ª, but farther apart than the coils 34 and 43. This glass tube 65ª is arranged to slide within the tube 65 on which the coils 34 and 43 are wound. Any suitable means may be employed for effecting the adjustment of the glass tubes as for example, the tube 65ª may be carried by a threaded rod passing through a yoke on the tube 65, and provided with the milled head 66, whereby the screw may be rotated to effect the adjustment of the inner tube 65. A capacity 46 may be arranged as shown in Fig. 5, and a dampening resistance 56 as shown. It will be seen that by moving the glass tube 65ª in and out of the tube 65, the ratio of transformation may be varied since the distance between the coils 34 and 43 is different from that between the coils 37 and 40. In this way the small adjustment necessary to produce exact neutralization is accomplished.

A form of mono-telephone is shown in Fig. 6 consisting of a permanent magnet 68 having similar poles 69 and 70. A soft iron strip 71 is so arranged as to be capable of vibrating to and fro between the poles 69 and 70 and is connected by a wire 73 to a diaphragm 72. A weight 74 is mounted on the upper end of the soft iron strip so as to be capable of adjustment, whereby to vary the natural period of vibration of the soft iron strip. The coil 75 of the telephone is wound as shown on the vibrating strip and a resonator 76 is arranged in suitable relation to the diaphragm 72. On the passage of a fluctuating current through the coil 75 the soft iron strip is caused to oscillate backward and forward, hence to produce a note which is reinforced or augmented by the resonator 76.

Fig. 7 shows another form of receiver which is tuned both electrically and mechanically. The diaphragm 77 preferably formed of thin mica or glass, has an armature 78 cemented thereto, the armature being formed of very thin iron wire. A small magnet 79, formed of thin iron and carrying the circuit 80, 81, 82, is arranged in suitable relation to the armature and diaphragm. The resonator 83 is arranged as described in Fig. 6. The diaphragm 77 may be constructed in the form of a strip, and is preferably made to have a natural period of oscillation identical with that of the resonator 83. When desired, the resonator 83 may be omitted. When used the resonator 83 should be tuned to the group frequency as should also be the diaphragm 77 when a tuned diaphragm is used. The circuit 80, 81, 82 preferably forms a part of a circuit tuned to the wave frequency and for this purpose a condenser may be inserted at 81ª.

I do not limit myself to the particular form of apparatus described herein as the broad method claimed by me consists in combining the effects produced on conductors tuned to periodicities both above and below the periodicity of the conductor or conductors which are tuned to the waves which it is desired to receive, with the effect produced on the latter conductor or conductors, so that any other impulse of a different periodicity from that which it is desired to receive will be unable to produce a signal.

I find it preferable to have the leads from the bottom of the vertical to ground as straight and short as possible. For this reason it is preferred to have the discharge gap immediately underneath the bottom of the vertical and as near to the surface of the ground as possible. This avoids the running of leads into the office which frequently acts to cut down the radiation to a very appreciable extent and to prevent sharp tuning. The leads from the lower end of the spark gap to ground are made to have relatively large capacity and small inductance. The effect of employing neutralizing conductors on each side of the resonant point is advantageous in that as is well known from the paper on "Fluorescence" in *Stokes' Collected Papers*, (see also J. J. Thomson's *Recent Researches in Electricity and Magnetism* 1893 paragraph 327, page 390 and paragraph 432, page 533,) resonant systems in which the vibrations are not forced tend to affect each other, and hence if the conductors are both of a higher or both of a lower periodicity than that of the receiving wire proper, the receiving wire tends to be pulled out of resonance, while by the use of wires on each side the effect is very much smaller and may be also completely neutralized. This matter of preventing interference is especially suited to station using the method of sending by throwing it in and out of tune, as in this case, if the neutralization is not absolutely complete, the sending of a signal does not produce the full amount of disturbance, but only a differential effect, that is, the difference in neutralization which would be produced by shifting the point of resonance slightly to the left or right. This is illustrated in Fig. 8, where the curve shown in the full line represents the position of the resonance curve, abscissæ being frequency and ordinates being intensity, when the sending key is down, and the resonance curve shown in the dotted line being the position of the resonance curve when the key is up. The lines 84 and 85 show the positions of the maximum points of these curves and lines 86 and 87 indicate by their length from the base line to the point at which they cut the curve, the intensity change of position of the resonant point.

It is preferred to use the larger inductances for tuning to the stations which are nearest at hand, *i. e.* use the lower frequencies in working between neighboring stations, as this tends to keep the intensity of received waves more nearly the same, and gives a general method and system which separates the tunes, which are apt to be received.

I claim—

1. In electric signaling, the method of neutralizing disturbing influences on a receiver, which consists in opposing to the effect of such influences on a circuit resonant to the signaling frequency the effect of such influences upon a circuit resonant to a different frequency.

2. The method of annulling disturbing influences in a receiving circuit for electromagnetic waves by providing two supplementary receiving circuits and causing them to neutralize all effect on the receiver when the frequency is not that desired.

3. In signaling by electromagnetic waves, the method which comprises transferring the energy from one circuit to another by transformer action, and varying the relative position of the primary and secondary to adjust the tuning of the primary and secondary circuits to various couplings corresponding to the character of disturbing impulses received.

4. In signaling by electromagnetic waves, the method which comprises counterbalancing the effects of disturbing impulses on a receiver by transferring the energy by transformation to several branch circuits, and meantime adjusting both the tuning and the ratio of coupling of said circuits according to the character of disturbing impulses, and combining the effects on a receiver.

5. In signaling by electromagnetic waves, the method which comprises balancing the effects of disturbing received impulses in branch circuits by adjusting their tune, transferring the energy of all impulses into other circuits by transformation, adjusting the ratio of transformation according to the character of disturbing impulses, and combining the effects on a receiver.

6. In signaling by electromagnetic waves, the method which comprises balancing the effects on a receiver of branch circuits by transferring the energy of said circuits by transformation into other circuits, adjusting the ratio of transformation, and combining the effects on a receiver.

In testimony whereof, I have hereunto set my hand.

REGINALD A. FESSENDEN.

Witnesses:
GEORGE M. COPENHAVER,
W. H. DE LACY.